Figure 1:
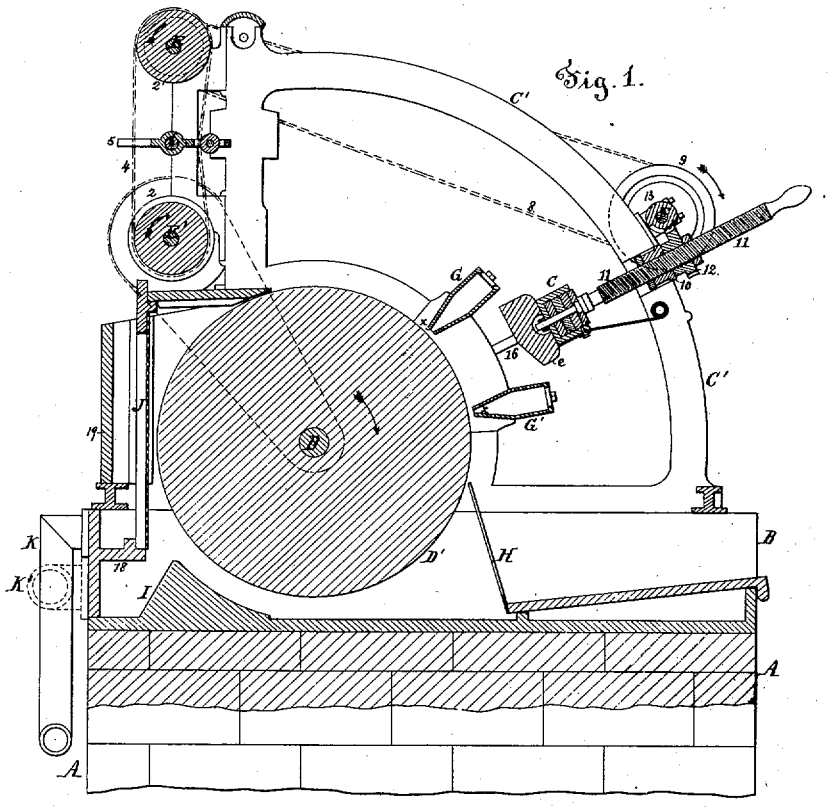

4 Sheets--Sheet 1.

HENRY VOELTER.

Improvement in Process of Reducing Refined Wood-Pulp for the Manufacture of Paper, &c.

No. 4,881. Reissued April 23, 1872.

Witnesses.
C. Wahlers.
Ernst Bilhuber.

Inventor.
Henry Voelter
per
Von Sachsenroed & Hauff
Attys

HENRY VOELTER.
Improvement in Process of Reducing Refined Wood-Pulp for the Manufacture of Paper, &c.
No. 4,881. Reissued April 23, 1872.
Fig. 2.
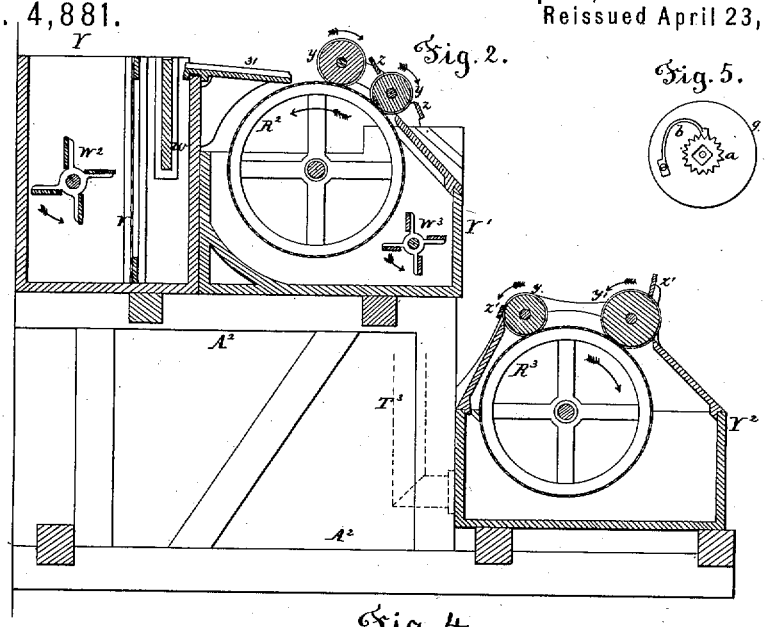
Fig. 5.
Fig. 4.
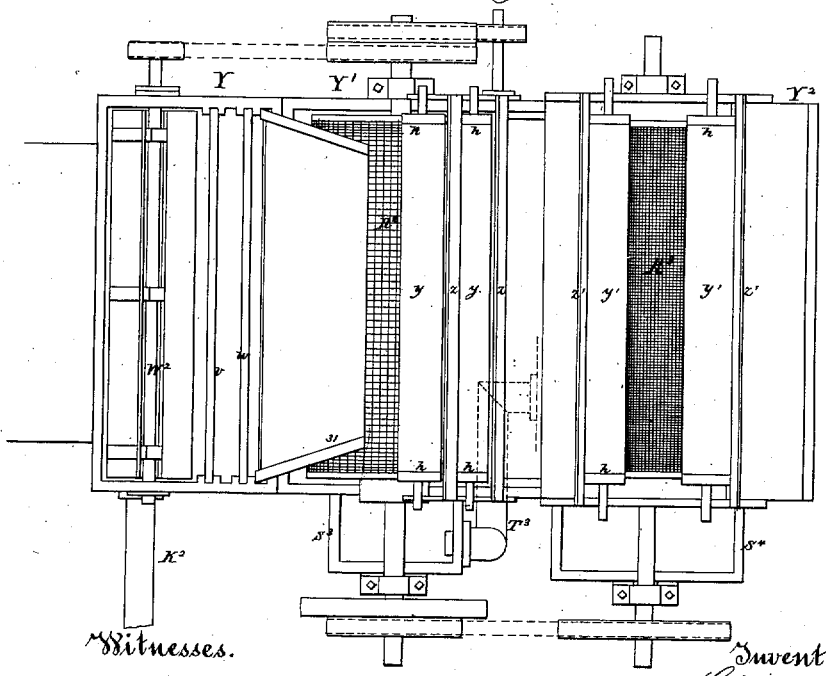
Witnesses.
C. Wahlers.
Ernst Bilhuber.
Inventor.
Henry Voelter
Van Santvoord & Hauff
Attys.

4 Sheets--Sheet 3.

HENRY VOELTER.

Improvement in Process of Reducing Refined Wood-Pulp for the Manufacture of Paper, &c.

No. 4,881. Reissued April 23, 1872.

Witnesses.

C. Wahlers.

Ernst Bilhuber.

Inventor.

Henry Voelter

Per Van Santvoord & Hauff Attys

4 Sheets--Sheet 4.

HENRY VOELTER.

Improvement in Process of Reducing Refined Wood-Pulp for the Manufacture of Paper, &c.

No. 4,881. Reissued April 23, 1872.

Witnesses.

C Wahlers.

Ernst Bilhuber.

Inventor.

Henry Voelter per

Van Santwoord & Hall

Attys

UNITED STATES PATENT OFFICE.

HENRY VOELTER, OF HEIDENHEIM, GERMANY, ASSIGNOR TO ALBERTO PAGENSTECHER, OF NEW YORK, N. Y.

IMPROVEMENT IN PROCESSES OF PRODUCING REFINED WOOD-PULP FOR THE MANUFACTURE OF PAPER, &c.

Specification forming part of Letters Patent No. 55,031, dated May 22, 1866; reissue No. 4,881, dated April 23, 1872.

*To all whom it may concern:*

Be it known that I, HENRY VOELTER, of Heidenheim, Wurtemberg, Germany, have invented a new and useful Process for Producing Refined Wood-Pulp to be used in the Manfacture of Paper; also certain machinery for carrying out the aforesaid process; and also certain improvements in machinery formerly patented by me for converting wood into pulp by a grinding process.

The process for producing refined pulp, as I term it, consists of several stages, viz.: First, grinding or reducing the wood; second, the separation of useless products of the grinding operation from the useful fibre; third, in assorting the fibre, separating the coarser from the finer; fourth, in regrinding or reducing the coarser fibers; fifth, in again assorting the fibers; sixth, in grinding the third time, if desired; and seventh, in assorting fibers which have been twice reground. Some of the stages of the process may be used without the others. I also combine with the regrinding and final assorting process, a process for depriving the mass of pulp of almost the whole of its water, so that it may be less bulky and weighty, and therefore more easily transported to the locality where it is to be mixed with other fiber to be made into paper.

The improvements in the machinery will be claimed hereafter, and the object of all the improvements, except those in the machinery formerly patented by me, is to obtain wood-pulp, the fibers of which are more uniform in size, and as a whole finer than those produced by any former process for the production of wood-pulp by mechanical means.

In order to enable others skilled in the art to make and use my invention, I will proceed to describe it by the aid of the accompanying drawing, which forms a part of this specification.

Figure 3:
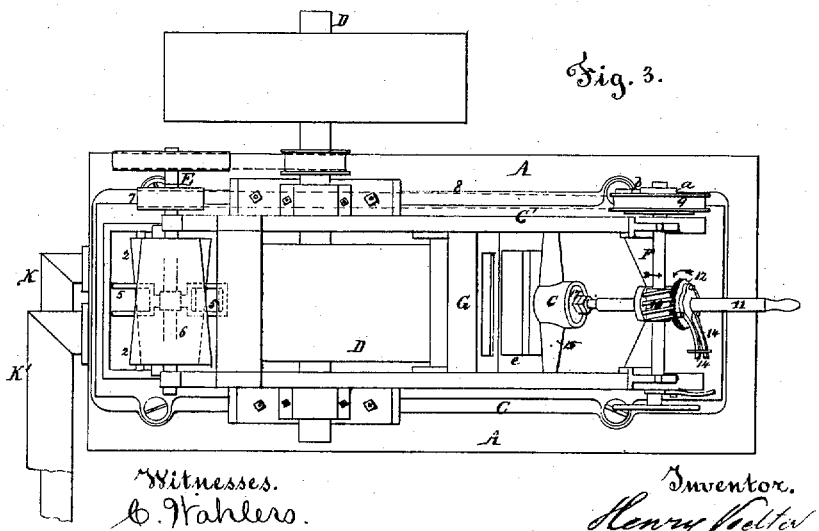
Figure 6:
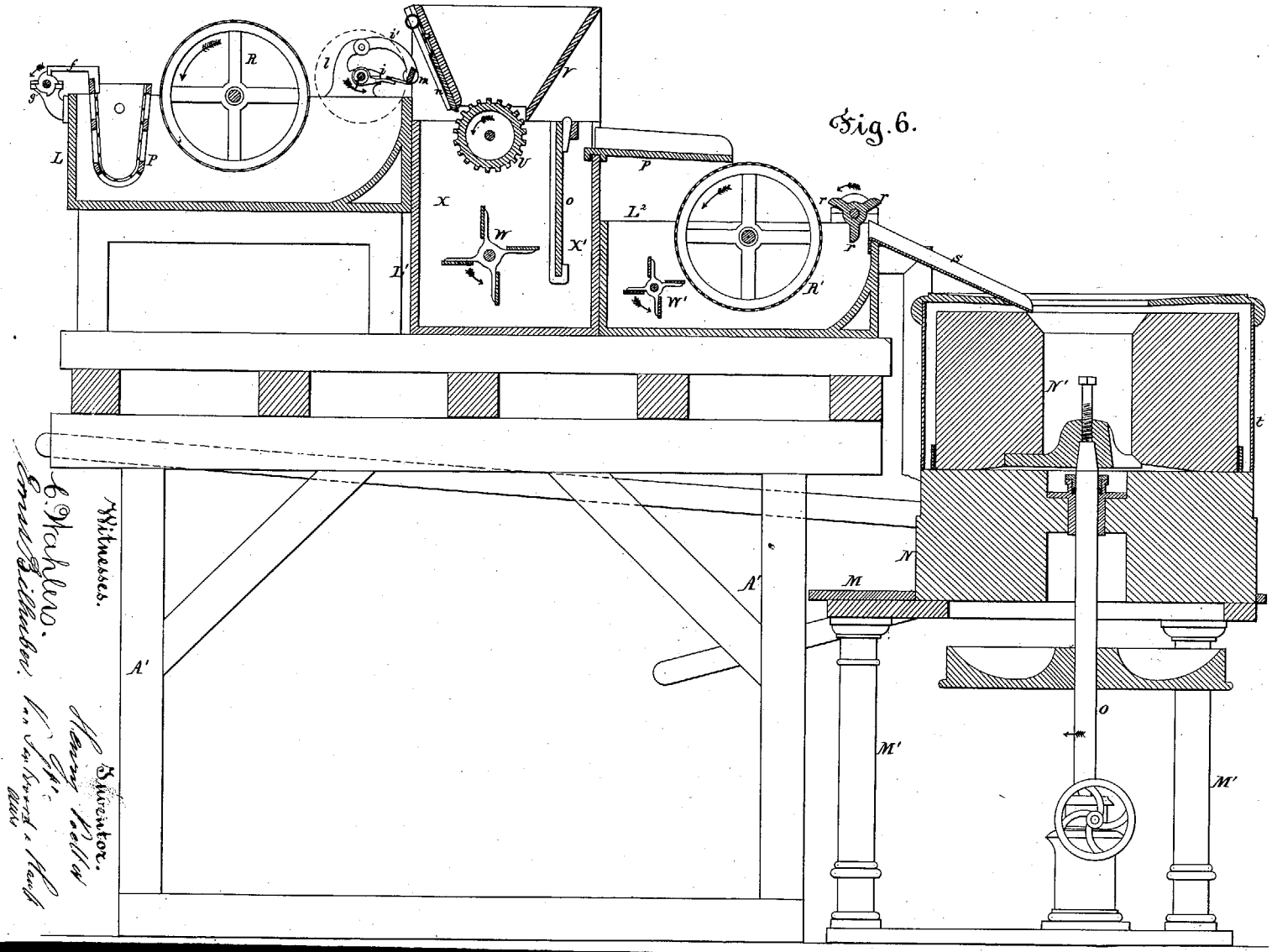
Figure 7:
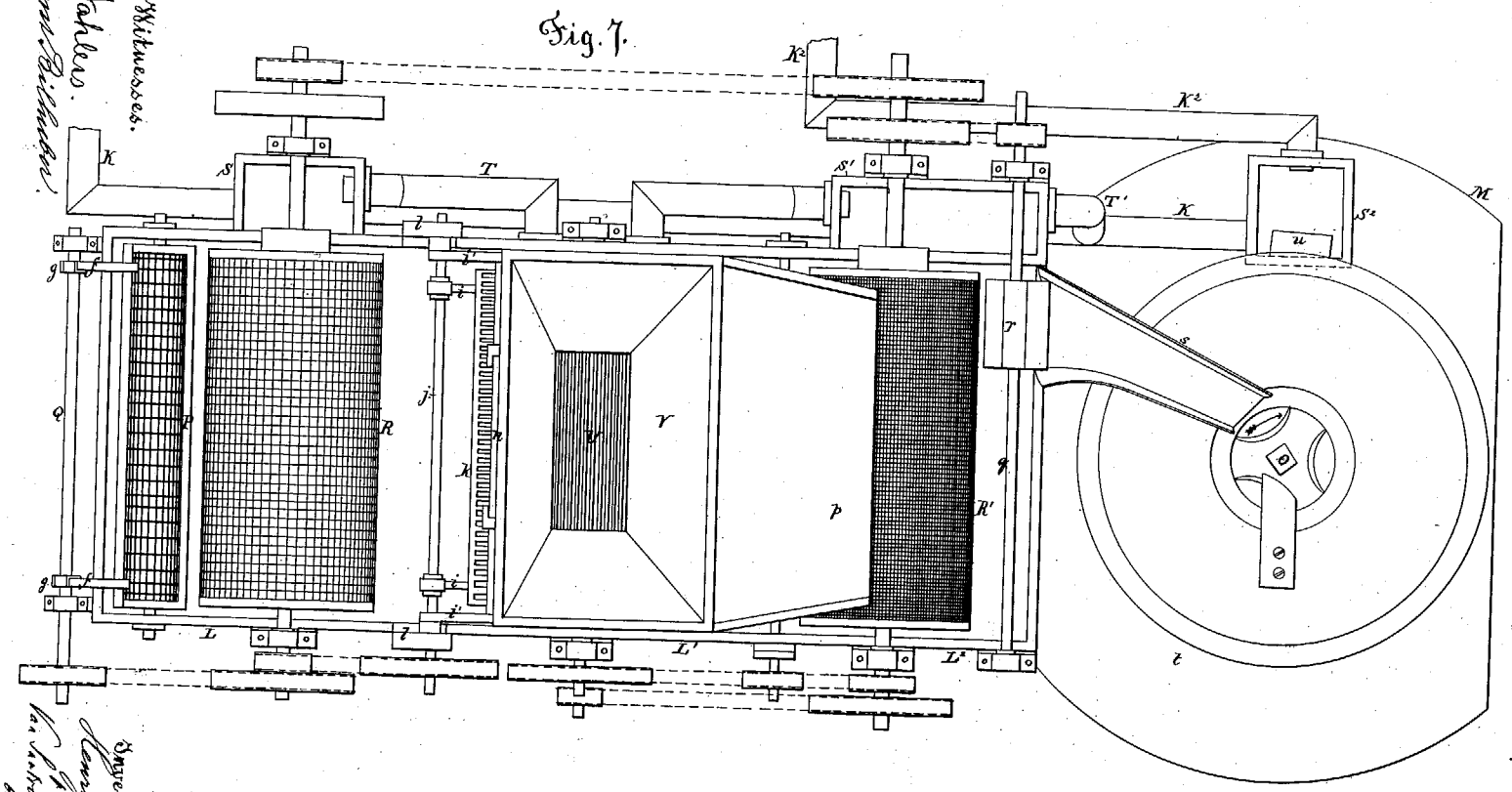

Figures 1 and 2, Sheets No. 1 and 2, are vertical longitudinal sections of parts of my improved apparatus for reducing wood fibers to paper-pulp. Figs. 3 and 4 are plan views of the same; Fig. 5, a detached view of part of the apparatus; Fig. 6, Sheet No. 3, a vertical longitudinal section through another portion of the apparatus; and Fig. 7, Sheet No. 4, a plan view of Fig. 6.

Similar letters refer to similar parts in the drawing.

On a suitable foundation, A, Fig. 1, rests an oblong box, B, and to opposite sides of the latter are secured quadrant-shaped frames C $C^1$, in which turn the shafts D, E, $E^1$, and F. To the shaft D is secured a grindstone, $D^1$, and to each of the shafts E $E^1$ is secured a conical pulley, 2, a belt, 4, passing around both pulleys and through the forked ends of a guide, 5, which is adjustable laterally on a screw-shaft, 6. On the shaft E is a pulley, 7, and on the shaft F turns a pulley, 9, a belt, 8, passing around both pulleys, and to the shaft E, adjacent to the pulley 9, is secured a ratchet-wheel, *a*, to the teeth of which is adapted the end of a spring-pawl, *b*, attached to the pulley 9. Through an opening in a cross-piece, 10, extending between the side frames, passes a screwed rod, 11; the said rod also passes through a worm-wheel, 12, which bears against the cross-piece, and is operated by a worm, 13, on the shaft F. To the upper side of the worm-wheel 12 are hung two jaws, which bear against opposite sides of the rod 11, and have threads cut in their edges, the said threads being adapted to the threads on the rod. To a cross-head, 15, which slides on guides 16 attached to the side frames, is secured a box, C, containing a rubber spring or cushion, *d*, and against the latter bears a disk, 17, on the rod 11, which projects through the cushion and through the bottom of the box, a nut on the lower end of the rod preventing the withdrawal of the latter. To the lower side of the cross-head 15 is secured a wooden block, *e*, the face of which, near the lower edge, is cut away, as shown in Fig. 1, for a purpose described hereafter. To the side frames are secured two hollow adjustable cross-pieces or boxes, G $G^1$, each of which communicate with a water-reservoir, and in the lower edge of each box, which is nearly in contact with the face of the stone $D^1$, is a narrow slit or opening, *x*. The adjacent sides of the boxes G $G^1$, near their lower edges, are parallel, and are such a distance apart as to permit the ready introduction between them of the block *e*. A rake, H, which prevents the passage of slivers, extends from the bottom of the box B to one side of the grindstone $D^1$, and at the bottom of the box, below the opposite side of the stone, is a projection, *i*, of the form shown in Fig. 1. On a shelf or partition, 18, at the end of the box B, rests a sieve, J, so fine that fibers which can pass it do not need regrinding, the upper portion of which is inclosed by a casing, 19, secured by the side frames, and to the edge of the box. Two pipes, K and $K^1$, communicate with this end of the box B, the former above and the latter below the partition 18. On a frame-work, $A^1$, Fig. 6, rests three tanks, L, $L^1$, and $L^2$, and in the tank L is hung a basket, P, of wire-gauze, or other suitable material, in such a manner that it receives a shaking motion by means of arms *f f* which project from the said basket, bearing on ratchet-wheels *g* secured to a shaft, Q, turning in brackets secured to the tank. In the tank L revolves a cylinder, R, of wire-gauze, which communicates at one end with a reservoir, S, Fig. 7, at the side of the tank; a pipe, T, leading from the said reservoir and communicating with the tank $L^1$ near the bottom of the latter. To arms *i i*, secured to a revolving shaft, *j*, turning in bearings attached to the tank L, is secured a comb, *k*; and to arms *i' i'*, hung to brackets *l l*, is secured a plate, *m*, for a purpose described hereafter. In the upper portion of the tank $L^1$ turns a shaft, on which is secured a fluted or serrated roller, *v*, and above the latter is a hopper, V, in guides, on one of the inclined sides of which slides a plate, *n*, the lower edge of the latter being parallel to the face of the roller. The tank L is divided by vertical partition O, which extends nearly to the bottom into two unequal-sized chambers, *x x*$^1$, and in the lower portion of the former turns a revolving stirrer or paddle-wheel, *w*. From the upper edge of the tank L extends an inclined conduit or chute, *p*, and below the latter, in the tank $L^2$, rotates a hollow cylinder, $R^1$, of wire-gauze, which communicates through an opening in one end and with a reservoir, $S^1$, Fig. 7, at the side of the tank. In the lower portion of the tank $L^2$, below the chute *p*, revolves a paddle-wheel, *w'*, and to a shaft, Q, which turns in suitable bearings secured to the tank, is attached a smaller paddle-wheel, *r*, the upper end of an inclined chute, $s^3$, being secured to the edge of the tank adjacent to the paddle-wheel *r*. On a platform, M, supported by pillars M' M', rests the lower stone N of a pair of millstones, the upper millstone $N^1$ being hung to and rotating with a vertical shaft, O, in the ordinary manner, and into the usual central opening in this stone projects the lower end of the chute $s^3$. The upper stone $N^1$ is surrounded by a casing, *t*, an opening at one side of which communicates with a box or reservoir, $S^2$, secured to the platform M. On a frame-work, $A^2$, Fig. 2, rest the tanks Y, $Y^1$, and $Y^2$, and in the former is a vertical sieve, *v*, and a partition, *w*, the latter extending across the upper portion only of the tank. On one side of the sieve *v* revolves a paddle-wheel, $W^2$, and from the opposite side of the tank a chute, 31, projects over a cylinder, $R^2$, of wire-gauze, which revolves in the tank $Y^1$. The cylinder $R^2$ communicates through an opening in one end with a reservoir, $S^3$, Fig. 4, a pipe, $T^3$, communicating with the latter and with the tank $Y^2$, in which turns a cylinder, $R^3$, which communicates with reservoir $S^4$, and against both this cylinder and the cylinder $R^2$ bear rollers *y y*$^1$, on the ends of which are bands *h* of leather or other suitable material, stationary plates *z z*$^1$ being secured at the side of each roller. In the tank $Y^1$ turns a paddle-wheel, $W^3$. The pipe K, Figs. 1 and 7, communicates with a pipe, $T^1$, leading from the reservoir $S^1$, and also with the reservoir $S^2$, and from the latter extends a pipe, $K^2$, which communicates with the tank Y. The material flowing through the pipe $K^1$ is discharged into the basket P, a pump or other suitable apparatus being used to elevate the material when the tank L is above the box B. The sections Z of wood to be disintegrated are placed between the boxes G $G^1$ and against the grindstone $D^1$; water is admitted to each of the said boxes and into the tank B, and a rotary motion in the direction of its arrow is imparted to each of the shafts D, E, $E^1$, and F; a rotary motion in the direction of its arrow is also imparted to each of the shafts Q, *j*, *q*, and *o*, to the paddle-wheels W, $W^1$, $W^2$, and $W^3$, to the cylinders U, R, $R^1$, $R^2$, and $R^3$, and to the rollers *y y*.

As the worm-wheel 12 is turned, the jaws 14 14, acting as a revolving nut, will cause the rod 11 to be moved forward, the block *e* being brought against the sections of wood introduced between the boxes, and feeding the sections of wood, prepared as described in my former patent, slowly toward the grindstone, by which they are disintegrated, the fibrous particles thus detached being carried into the box B. The under pressure of the wood against the stone is prevented by the elastic cushion D, which also yields slightly to permit the wood to accommodate itself to inequalities in the stone, while the wedging of the blocks between the sides of the boxes G $G^1$ and the stone is prevented by making the adjacent sides of the boxes parallel. The speed of the forward movement of the rod 11 in proportion to that of the stone is regulated by adjusting the belt 4 on the pulleys 2. The spring-pawl *b*, through the medium of which motion is conveyed from the pulley 9 to the shaft F, is sufficiently rigid to retain its hold on the ratchet-wheel *b*, so long as no unusual resistance is offered to the forward movement of the rod 11 and the cross-head. When, however, the blocks of wood are not disintegrated with sufficient rapidity, or the forward movement of the rod 11 is otherwise interrupted or retarded, the pawl *b* will yield and slip over the teeth of the ratchet-wheel, the rattling noise thus produced informing the attendant of the necessity of readjusting the belt 4 to diminish the speed of the shaft F. As the block *e* is brought near the face of the stone, that portion of the wood beneath the inclined face of the block will be cut to a wedge-shape, the thick edge being toward the box $G^1$. By this means small particles of wood are prevented from being wedged into the narrow space between the box $G^1$ and the stone, to the retardation of the revolution of the latter. The fibers of the wood, as they are detached, descend and pass between the teeth of the rake H, while such coarser particles and slivers as are accidentally detached, which are useless and would injure the sieves, are arrested by the rake. The finest fibers pass through the sieve J with the water thrown up by the stone, and are conducted through the pipe K to the reservoir $S^2$, Fig. 7, while the larger particles fall in front of the projection I, and pass with the water which flows through the pipe K′ into the basket P, Fig. 6.

All the finer fibers supplied by K′ which can be used pass through the meshes of the basket P, while the greater portion of the small chips and slivers which have passed the rake are retained in the basket and removed from time to time, such a vibrating motion being imparted to the basket by the action of the ratchet-wheels *g* as will prevent the meshes from being obstructed. The fibers now pass with the water into the gauze-cylinder R, and out of the latter into the reservoir S, and through the pipe T to the tank L. Any remaining useless chips and slivers lodge on the surface, or stick in the meshes of the cylinder R, and are carried within range of the rotating comb K, by which they are caught and carried upward until the comb strikes the plate *m*. As the comb continues to revolve the plate *m* slides forward and scrapes off the adhering chips and slivers, which fall into any suitable receptacle, and are from time to time removed and thrown away. The products of the grindstone are thus cleared of the useless slivers, chips, &c., which would injure the sieves or cylinders. After the contents of the reservoir S are introduced into the tank L′ they are thoroughly agitated and mixed by the action of the paddle-wheel W, a mash being thus produced which is directed upward through the chamber *x′* and onto the chute *p*, from which it falls onto the cylinder $R^1$. The finer filaments which pass through the cylinder $R^1$ are conveyed into the reservoir $S^1$, and through the pipes T K into the reservoir $S^2$, while the mash which remains in the tank, and which contains but little water, is stirred and agitated by the paddle-wheel $W^1$, and is, by the action of the paddle-wheel *r*, caused to flow into the chute S, down which it flows into the opening in the upper millstone $N^1$. As the fibers pass between the millstones they are split and broken into finer filaments, the stones being so prepared that the fibers may be cut rather than worn. The fibers, after being reground, pass from the stones into the casing *b*, and then into the reservoir $S^2$. The pulp flows from the reservoir $S^2$ through the pipe $K^2$ into the tank Y, where it is directed by the paddle-wheel $W^2$ against the sieve *v*, the finest fibers passing through the latter and upward to the chute 31, from which they fall onto the cylinder $R^2$; the fibers which pass into this cylinder being conducted to the reservoir $S^3$, and through the pipe $T^3$ to the tank $Y^2$. The pulp in the tank $Y^1$ is agitated by the paddle-wheel $W^3$, so that every portion may be brought into contact with the cylinder. The gauze on the cylinder $R^3$ is too fine to permit any of the fibers to pass through the same. The superfluous water, however, flows into the cylinder and into the reservoir $S^4$, from which it is removed by a syphon or other suitable apparatus. As the cylinders $R^2$ $R^3$ revolve, the fibers on the surfaces of the same are transferred to the rollers *y y*, and after being scraped from the latter by the plates *z*, fall into any suitable receptacle, the leather bands *h h*, at the ends of the rollers, maintaining the surfaces of the same from contact with those of the cylinders, which are thus preserved from abrasion. The coarse fibers detached by the plates *z*, as well as those remaining in the tank Y, may be placed in the hopper V, from which they are fed into the tank L by the fluted roller U, the sliding plate *n* being adjusted to regulate the passage of the fibers in such quantities as may be desired. These fibers are discharged from the tank $L^1$ into the tank $L^2$, and, after passing between the millstones, are sorted in the tanks Y $Y^1$ and $Y^2$, as before. If fibers are required which are not so finely divided as those which pass into the tank $Y^2$, they may be removed at any stage of the process, and it will be apparent that any desired number of tanks and cylinders may be employed in order to obtain a greater assortment of fibers.

Instead of arranging the cylinders as described, they may be placed with their shafts inclined, and the material may be introduced into the interior of the cylinders, the finer particles passing through the latter into the tanks, while the coarser fibers are rolled toward the lower end and discharged into any suitable receptacle. A perforated pipe communicating with a water-reservoir may be arranged adjacent to each of the cylinders and sieves, so as to throw a constant stream of water into the same, and thus maintain the meshes unobstructed.

Although I have shown and described a pair of horizontal millstones as being employed for dividing the fibers, the stones may be arranged vertically, or in any other suitable position. They may also be conical, fitting one within the other, or of any other desired shape.

In the process of reducing wood to fiber by a grinding operation, it always happens that slivers, chips, or small pieces of wood too large either to be used as pulp or to be reground, (because they would choke the stones or lift the upper one when stones arranged as shown in the drawing are employed,) are detached accidentally from the wooden blocks.

These useless pieces of wood are separated from the useful fibers, first, at the rake; second, at the shaking-basket; and, third, at the first cylinder R; and it is better thus to get rid of them at three operations than to remove them all at once; and this separation of the useless from the useful products of the first grinding, by means of sieves—for the rake, the basket, and the first cylinder are all, in fact, sieves—and a current of water, bearing both fibers and chips, is the separating process. The fibers which result from the action of the first stone upon the blocks are assorted at the sieve J at the cylinder $R^1$, in the preferred form of apparatus, and none of the fibers which pass these sieves are reground. This separation of coarser from finer fibers by sieves and a current of water is the assorting stage of the process. All the fibers might pass directly from the first to the second stone without being assorted, but in that case the finer fibers would probably be made too fine, and rendered useless; and, at any rate, the regrinding-stones would be uselessly loaded with matter which did not need to be acted upon by them.

When a sieve of any kind is employed to assort fiber, the greater part of the water passes through the sieve, and the fiber which does not pass the sieve is left in a pasty state. This is the preferrable state for regrinding, and I therefore use a paddle-wheel to keep the mass in motion to prevent its settling, and another wheel to produce a current to carry the mass to the shute.

The regrinding or reducing process is that which is effected by the action of the stones upon the mass of fiber introduced between them. The assorting after the regrinding is caused by the action of a fiber-bearing current and the sieves V and $R^2$. The fibers which do not pass V may be ground a third time. So also may those which do not pass $R^2$, and the pulp is deprived of the greater portion of its water, so as to fit it for transportation, by means of the cylinders $R^2$ $R^3$ and the rollers which gather the fibers from their surface. The cylinder $R^2$ is, therefore, always a part of the assorting apparatus used after regrinding, and when the fibers gathered from its surface are not ground a third time it is also, in connection with the rollers, a contrivance for partially drying the pulp.

In place of the paddle-wheel *r*, cords may be wound spirally around the cylinder $R^1$, so that as the latter revolves the material is caused to flow toward one side of the tank, and, consequently, into the chute.

Having thus described my process and machinery, I wish, before claiming what is new therein, that it should be distinctly understood that processes for grinding fiber, for assorting fiber, for separating useless fiber or chips, and for depriving pulp of a portion of its water, are all old, considered separately; and that shaking baskets, shaking screens, revolving screens, and stationary screens, are all old and well-known machines, both for separating useless matter and for assorting fiber. So are tanks and pipes or conduits used in connection therewith. So are millstones and grinding-mills of various kinds; but wooden fibers, produced by grinding with water, have never before, to my knowledge, been reground, and this is the great feature which is the foundation of my invention.

I claim, as of my own invention—

1. The process for producing refined wood-pulp, consisting of the following stages, viz.: First, grinding the wood; second, separating the useless chips; third, assorting the fibers; fourth, regrinding the fibers; and, fifth, assorting the reground fibers.

2. I claim, second, in combination with all these stages of the process, the process of depriving the pulp of water to a certain extent, so as to fit it for transportation.

3. I claim, in combination, the following stages of a complete process, viz.: An assorting process prior to regrinding, a regrinding process, and an assorting process subsequent to regrinding; and 4. In combination with all of these, a separating process, for separating the useles chips prior to the first assorting process.

5. I claim, in combination, the following stages of a complete process, viz.: a regrinding process, and an assorting process subsequent thereto; and 6. In combination with these two stages of a complete process, I claim the process of depriving the pulp of a portion of its water, so as to fit it for transportation.

7. I claim, in combination, the following stages of a complete process, viz.: First, an assorting process; and, second, a regrinding process; and, in combination with these, I claim—

8. A process for separating chips or useless fiber prior to the assorting process.

9. I claim, in combination, the following stages of a complete process, viz.: First, regrinding; second, assorting; third, grinding for the third time; and, fourth, assorting the products of the third grinding; and I claim—

10. The above three stages, in combination, without the fourth.

11 .I claim, in combination, a grinding process, a separating process, an assorting process, and a regrinding process; and I wish it distinctly understood that I only claim these stages of a process for producing refined wood-pulp in the above-enumerated combinations when they are conducted substantially in the manner and severally and in combination produce the effects hereinbefore described.

12. I claim, in combination, machinery for grinding wooden blocks, for separating useless chips, for assorting fiber, and for regrinding the same, all being and acting substantially as specified; and in combination with these I claim—

13. Machinery for assorting the reground or refined fibers, substantially such as specified.

14. I claim, in combination, separating machinery, assorting machinery, regrinding machinery, and reassorting machinery, all substantially such as described, and acting in combination, as set forth.

15. I claim the combination of machinery for assorting fibers, regrinding machinery, and machinery for assorting the reground or refined fibers, the machinery being and acting substantially as specified.

16. I claim, in combination, machinery for regrinding wood-pulp, and machinery for assorting the same after it is reground; and 17. In combination with such machinery, mechanism for partially drying the reground fibers prior to transportation, the machinery constituting these two combinations being substantially such as hereinbefore set forth.

18. I claim the spring-pawl and ratchet-wheel, constructed and operating substantially as specified, in combination with driving mechanism and machinery for forcing the wooden blocks against the stone.

19. I claim, in combination with a revolving stone and contrivances between which a block of wood is held in position to be reduced to fibers, a feeding-screw and an elastic cushion applied between the screw and the block of wood to be reground, the combination being and acting substantially as specified.

20. I claim the block or follower *e*, formed substantially as described, in combination with the grindstone and boxes, between which the block to be reduced to fiber is contained, the combination being substantially such as described.

21. I claim the hopper, with its sliding door, in combination with a revolving fluted cylinder and a tank, all arranged and operating as set forth; and 22. Lastly, I claim the following stages of my complete process, viz.: First reducing wooden blocks to fiber, in combination with a regrinding of such fibers; and also machinery for reducing blocks to fiber, in combination with machinery for regrinding the said fibers; the stages of the process and the machinery thus claimed being substantially such as hereinbefore set forth.

HENRY VOELTER.

Witnesses.
GUSTAVE SCHOLL,
HEINR. GUT.